(12) United States Patent
McAfee et al.

(10) Patent No.: US 8,677,229 B2
(45) Date of Patent: Mar. 18, 2014

(54) PRESENTATION OF FILES PACKAGED WITHIN A PAGE DESCRIPTION LANGUAGE DOCUMENT

(75) Inventors: Robert K. McAfee, San Jose, CA (US); Randy L. Swineford, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1266 days.

(21) Appl. No.: 11/864,714

(22) Filed: Sep. 28, 2007

(65) Prior Publication Data

US 2009/0089656 A1    Apr. 2, 2009

(51) Int. Cl.
*G06F 17/00*    (2006.01)

(52) U.S. Cl.
USPC .................................................. 715/200

(58) Field of Classification Search
USPC .................................................. 715/200
See application file for complete search history.

(56) References Cited

U.S. PATENT DOCUMENTS

| | | |
|---|---|---|
| 5,706,457 A | 1/1998 | Dwyer et al. |
| 6,237,011 B1 | 5/2001 | Ferguson et al. |
| 6,278,455 B1 | 8/2001 | Baker |
| 6,292,186 B1 | 9/2001 | Lehman et al. |
| 6,304,897 B1 | 10/2001 | Venkatraman et al. |
| 6,636,246 B1 | 10/2003 | Gallo et al. |
| 7,013,435 B2 | 3/2006 | Gallo et al. |
| 7,031,968 B2 | 4/2006 | Kremer et al. |
| 7,035,880 B1 | 4/2006 | Crescenti et al. |
| 7,076,728 B2 | 7/2006 | Davis et al. |
| 7,089,248 B1 | 8/2006 | King et al. |
| 7,139,977 B1 | 11/2006 | Russell |
| 7,412,650 B2 | 8/2008 | Gallo |
| 7,506,359 B1 | 3/2009 | Ling |
| 7,603,615 B2 | 10/2009 | Lee et al. |
| 7,634,775 B2 * | 12/2009 | McLuckie et al. ............ 718/104 |
| 7,823,064 B1 | 10/2010 | Levy |
| 7,913,053 B1 | 3/2011 | Newland |
| 2002/0059337 A1 | 5/2002 | Takaoka et al. |
| 2002/0073058 A1 | 6/2002 | Kremer et al. |
| 2002/0147735 A1 | 10/2002 | Nir |
| 2003/0033296 A1 | 2/2003 | Rothmuller et al. |
| 2003/0066027 A1 * | 4/2003 | Nakagiri ........................ 715/500 |
| 2003/0115171 A1 | 6/2003 | Mangalvedhekar |
| 2003/0196120 A1 | 10/2003 | Raley et al. |

(Continued)

FOREIGN PATENT DOCUMENTS

| | | |
|---|---|---|
| WO | WO-2009045679 A1 | 4/2009 |
| WO | WO-2009143139 A2 | 11/2009 |

OTHER PUBLICATIONS

"Adobe Presenter 6 User Guide", copyright 2006 Adobe, p. 1-79.*

(Continued)

*Primary Examiner* — Amelia Rutledge
(74) *Attorney, Agent, or Firm* — Schwegman Lundberg & Woessner, P.A.

(57) ABSTRACT

Various embodiments herein provide one or more systems, methods, software, and data structures for presentation of files packaged within a page description language document, such as a Portable Document Format ("PDF") document. Some embodiments include a packaged file presentation shell that may be instantiated within a user interface of a page description language reader application to provide a view of files packaged within a page description language file. Some such views may be interactive or adaptive within the user interface.

13 Claims, 7 Drawing Sheets

(56) References Cited

U.S. PATENT DOCUMENTS

| | | | |
|---|---|---|---|
| 2004/0004636 A1 | 1/2004 | van Driel | |
| 2004/0049513 A1 | 3/2004 | Yakir et al. | |
| 2004/0205633 A1 | 10/2004 | Martinez et al. | |
| 2004/0210535 A1 | 10/2004 | Erickson | |
| 2004/0215657 A1 | 10/2004 | Drucker et al. | |
| 2005/0151756 A1 | 7/2005 | Miyamoto et al. | |
| 2005/0177389 A1 | 8/2005 | Rakowicz | |
| 2005/0193330 A1 | 9/2005 | Peters | |
| 2005/0209955 A1 | 9/2005 | Underwood et al. | |
| 2005/0216532 A1 | 9/2005 | Lallier | |
| 2005/0268217 A1* | 12/2005 | Garrison | 715/505 |
| 2006/0156228 A1 | 7/2006 | Gallo et al. | |
| 2006/0161863 A1 | 7/2006 | Gallo | |
| 2006/0178215 A1 | 8/2006 | Lehikoinen et al. | |
| 2006/0184540 A1 | 8/2006 | Kung et al. | |
| 2006/0206807 A1* | 9/2006 | Rosner et al. | 715/515 |
| 2006/0291504 A1 | 12/2006 | Cohn | |
| 2007/0016546 A1* | 1/2007 | De Vorchik et al. | 707/1 |
| 2007/0033237 A1 | 2/2007 | Prahlad et al. | |
| 2007/0067362 A1 | 3/2007 | Mcardle | |
| 2007/0204211 A1 | 8/2007 | Paxson | |
| 2007/0226204 A1* | 9/2007 | Feldman | 707/5 |
| 2007/0240079 A1 | 10/2007 | Flynt et al. | |
| 2008/0034381 A1 | 2/2008 | Jalon et al. | |
| 2008/0130966 A1 | 6/2008 | Crucs | |
| 2009/0217173 A1 | 8/2009 | Manheimer | |
| 2009/0292980 A1 | 11/2009 | Swineford et al. | |
| 2010/0057765 A1 | 3/2010 | Dispensa et al. | |
| 2010/0057884 A1 | 3/2010 | Brownell et al. | |
| 2010/0306283 A1 | 12/2010 | Johnson et al. | |

OTHER PUBLICATIONS

"Acrobat Multimedia JavaScript Reference, Version: Acrobat 6.0", Adobe Systems Incorporated, Apr. 2004, p. 1-125.*

"International Application Serial No. PCT/US2008/075388, International Search Report Mailed Jan. 13, 2009", 7 pgs.

"International Application Serial No. PCT/US2008/075388, Written Opinion mailed Jan. 13, 2009", 7 pgs.

"Open Packaging Format (OPDF) 2.0 v0.984", [Online]. Retrieved from the Internet: <URL:http://www.idpf.org/2007/opf/OPF_2.0_0.984_draft.html>, (Apr. 16, 2007), 35 pgs.

"Specifications for the Digital Talking Book", [Online]. Retrieved from the Internet: <URL:http://www.niso.org/workrooms/daisy/Z39-86-2005.pdf>, Navigation Control File (NCX), (Apr. 21, 2005), 43-56.

"International Application Serial No. P0CT/US2009/044496, Search Report mailed Jun. 3, 2010", 4 pgs.

"International Application Serial No. PCT/US2009/044496, Written Opinion mailed Jun. 3, 2010", 6 pgs.

"37 Signals. This is Signal vs. Noise, a weblog by 37 signals about design, business, experience, simplicity, the web, culture, and more.", *Cover Flow and the scrolling horizontal subnav at the new Apple.com*—(37signals, [Online] Retrieved from the internet: May 15, 2008 <URL:http://www.37signals.com/svn/posts/464-cover-flow-and-the-scrolling-horizontal-subnav-a...>, 18 pages.

"CreativSpace image search—finally a cool image search", [Online] Retrieved from the internet: May 15, 2008 <URL:http://creativspace.at/>, 1 page.

"Dynamic PageFlip 3.4", [Online] Retrieved from the internet: Apr. 15, 2008 <URL:http://www.pageflip.hu/>, 2 pages.

"Great cover version", *Apple—iTunes—iTunes Jukebox—Cover Flow*, [Online] Retrieved from internet: May 19, 2008 <URL:http://www.apple.com/itunes/jukebox/coverflow.html>, 1 page.

"POD Tech Combine PDF's", *Adobe Acrobat 8 Packages: Combine PDFs | PodTech.net*, [Online] Retrieved from the internet: Apr. 15, 2008 <URL:http://www.podtech.net/home/1761/adobe-acrobat-8-packages-combine-pdfs>, (Dec. 29, 2006), 2 pages.

Del Strother, Jonathan, et al., "Cover Flow", From Wikipedia, the free encyclopedia (Redirected from Cover flow), [Online] Retrieved from the internet: May 15, 2008 <URL:http://en.wikipedia.org/wiki/Cover_flow>, (Sep. 11, 2006), 2 pages.

Graham, Jamey, et al., "iCandy: a Tangible User Interface for iTunes", Copyright is held by the author/owner(s). CHI 2008, Apr. 5, 2008, Florence, Italy. ACM 978-1-60558-012—Aug. 8, 2004., (Apr. 5, 2008), 6 pages.

"Application U.S. Appl. No. 11/864,694, Non-Final Office Action mailed Feb. 17, 2011", 21 pgs.

"Application U.S. Appl. No. 12/123,624, Response filed Mar. 7, 2011 to Non-Final Office Action mailed Dec. 7, 2010", 8 pgs.

Toub, S, "View Data your Way With Our Manage Preview Handler Framework", MSDN vol. 22 Issue 1., Available from: Computers & Applied Sciences Complete, Ipswich, MA. Accessed Feb. 11, 2011., (Jan. 2007), 52-67.

Zwicky, E D, "Further torture: more testing of backup and archives programs, in: Proceeding of the 17th Annual Large Installation Systems Administration Conference", LISA 2003, San Diego, CA, USA, (Oct. 2003), 7-14.

"U.S. Appl. No. 12/123,635, Final Office Action mailed Nov. 22, 2011", 24 pgs.

"U.S. Appl. No. 12/326,691, Non-Final Office Action mailed Nov. 15, 2011", 37 pgs.

"U.S. Appl. No. 09/610,738, filed Jul. 6, 2000", 28 pgs.

"U.S. Appl. No. 11/864,694, Response filed Feb. 27, 2012 to Final Office Action mailed Aug. 31, 2011", 8 pgs.

"U.S. Appl. No. 12/123,615, Non Final Office Action mailed Oct. 5, 2012", 29 pgs.

"U.S. Appl. No. 12/123,615, Response filed Jan. 30, 2012 to Final Office Action mailed Sep. 28, 2011", 13 pgs.

"U.S. Appl. No. 12/123,635, Final Office Action mailed Dec. 6, 2012", 27 pgs.

"U.S. Appl. No. 12/123,635, Non Final Office Action mailed Jun. 7, 2012", 24 pgs.

"U.S. Appl. No. 12/123,635, Response filed Feb. 22, 2012 to Final Office Action mailed Nov. 22, 2011", 14 pgs.

"U.S. Appl. No. 12/123,635, Response filed Sep. 5, 2012 to Non-Final Office mailed Jun. 7, 2012", 14 pgs.

"U.S. Appl. No. 12/123,640, Final Office Action mailed Dec. 2, 2011", 32 pgs.

"U.S. Appl. No. 12/123,640, Response filed Jun. 1, 2012 to Non Final Office Action mailed Dec. 2, 2011", 10 pgs.

"U.S. Appl. No. 12/326,691, Examiner Interview Summary mailed Jun. 29, 2012", 3 pgs.

"U.S. Appl. No. 12/326,691, Final Office Action mailed Apr. 18, 2012", 42 pgs.

"U.S. Appl. No. 12/326,691, Response filed Feb. 15, 2012 to Non-Final Office Action mailed Nov. 15, 2011", 11 pgs.

"U.S. Appl. No. 12/326,691, Response filed Jul. 16, 2012 to Final Office Action mailed Apr. 18, 2012", 12 pgs.

"U.S. Appl. No. 13/052,829, Non Final Office Action mailed Sep. 11, 2012", 18 pgs.

"U.S. Appl. No. 13/052,829, Response filed Dec. 11, 2012 to Non-Final Office Action mailed Sep. 11, 2012", 13 pgs.

"U.S. Appl. No. 11/864,694, Final Office Action mailed Aug. 31, 2011", 18 pgs.

"U.S. Appl. No. 11/864,694, Response filed Jun. 16, 2011 to Non-Final Office Action mailed Feb. 17, 2011", 16 pgs.

"U.S. Appl. No. 12/123,615, Final Office Action mailed Sep. 28, 2011", 28 pgs.

"U.S. Appl. No. 12/123,615, Non-Final Office Action mailed May 27, 2011", 30 pgs.

"U.S. Appl. No. 12/123,615, Response filed Aug. 29, 2011 to Non-Final Office Action mailed May 27, 2011", 17 pgs.

"U.S. Appl. No. 12/123,624 , Response filed Sep. 27, 2011 to Final Office Action mailed May 27, 2011", 9 pgs.

"U.S. Appl. No. 12/123,624, Final Office Action mailed May 27, 2011", 19 pgs.

"U.S. Appl. No. 12/123,635, Non Final Office Action mailed May 27, 2011", 19 pgs.

"U.S. Appl. No. 12/123,635, Response filed Aug. 29, 2011 to Non-Final Office Action mailed May 27, 2011", 12 pgs.

"U.S. Appl. No. 12/123,640, Response filed Sep. 9, 2011 to Non-Final Office Action mailed Jun. 9, 2011", 12 pgs.

(56) References Cited

OTHER PUBLICATIONS

"U.S. Appl. No. 12/123,640, Non-Final Office Action mailed Jun. 9, 2011", 28 pgs.

"U.S. Appl. No. 12/326,691, Response filed Sep. 1, 2011 to Restriction Requirement mailed Aug. 30, 2011", 9 pgs.

"U.S. Appl. No. 12/326,691, Restriction Requirement mailed Aug. 30, 2011", 6 pgs.

"The Microsoft Office Open XML Formats, Preview for Developers", Microsoft, (Jun. 2005), 1-21.

Bott, et al., "Special Edition Using Microsoft Office 2007", Que Publishing, (Dec. 22, 2006), 2 pgs.

Rice, Frank, "How to: Manipulate Office Open XML Formats Documents", Microsoft, [Online] Retrieved from the Internet: <http://msdn.microsoft.com/en-us/library/aa982683(d=printer,v=office.12).aspx> Accessed Mar. 2, 2011, (Dec. 2006), 1-25.

"U.S. Appl. No. 12/123,624, Non Final Office Action mailed Dec. 7, 2010", 16 pgs.

\* cited by examiner

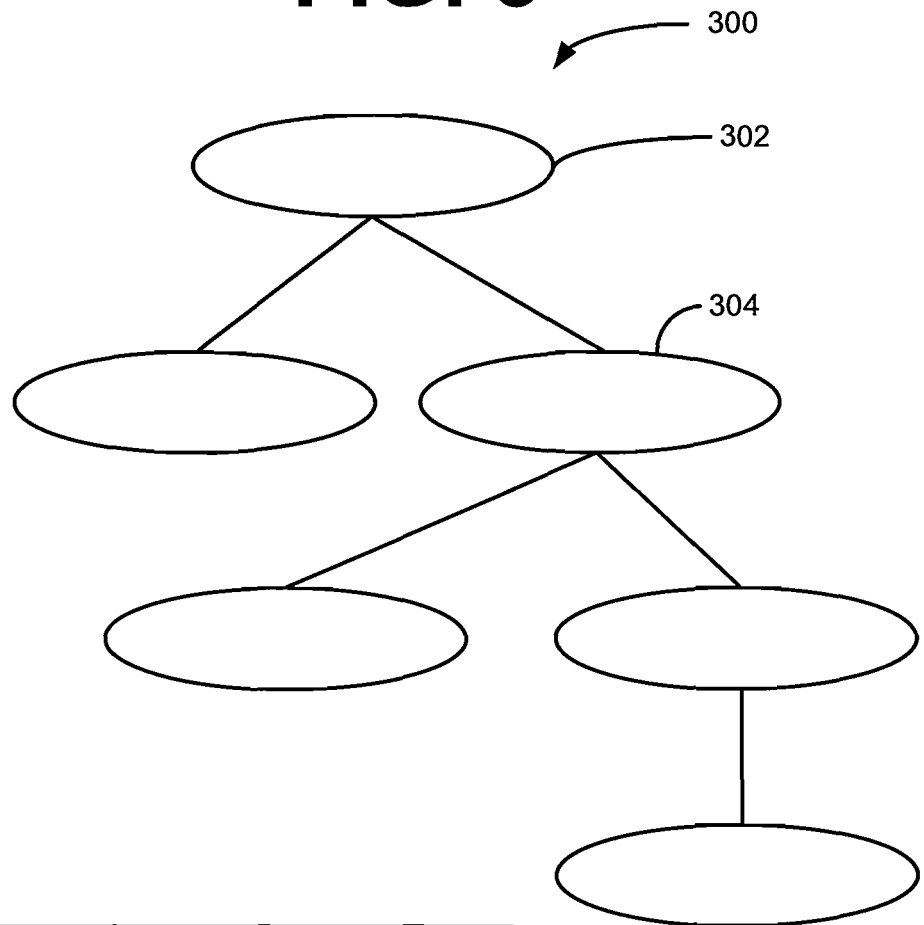

FIG. 4

```
400
%PDF-1.8
    1 0 OBJ
        % CALL TO NAVIGATOR/PACKAGED FILE PRESENTATION
        % SHELL FILE
    ENDOBJ 2 0 OBJ
        % PACKAGED SWF FILE WITH NODE META DATA
        % DESCRIBING AND REFERENCING PACKAGED FILES
        % 1, 2, AND 3
    ENDOBJ 3 0 OBJ
        % PACKAGED FILE 1
    ENDOBJ 4 0 OBJ
        % PACKAGED FILE 2
    END OBJ 5 0 OBJ
        % PACKAGED FILE 3
    ENDOBJ 6 0 OBJ
        % IMAGE FILE REFERENCED BY THE PACKAGED FILE
        % PRESENTATION SHELL FILE
    ENDOBJ

TRAILER
        % INDEX TO OBJECTS
    END TRAILER

%%EOF
```

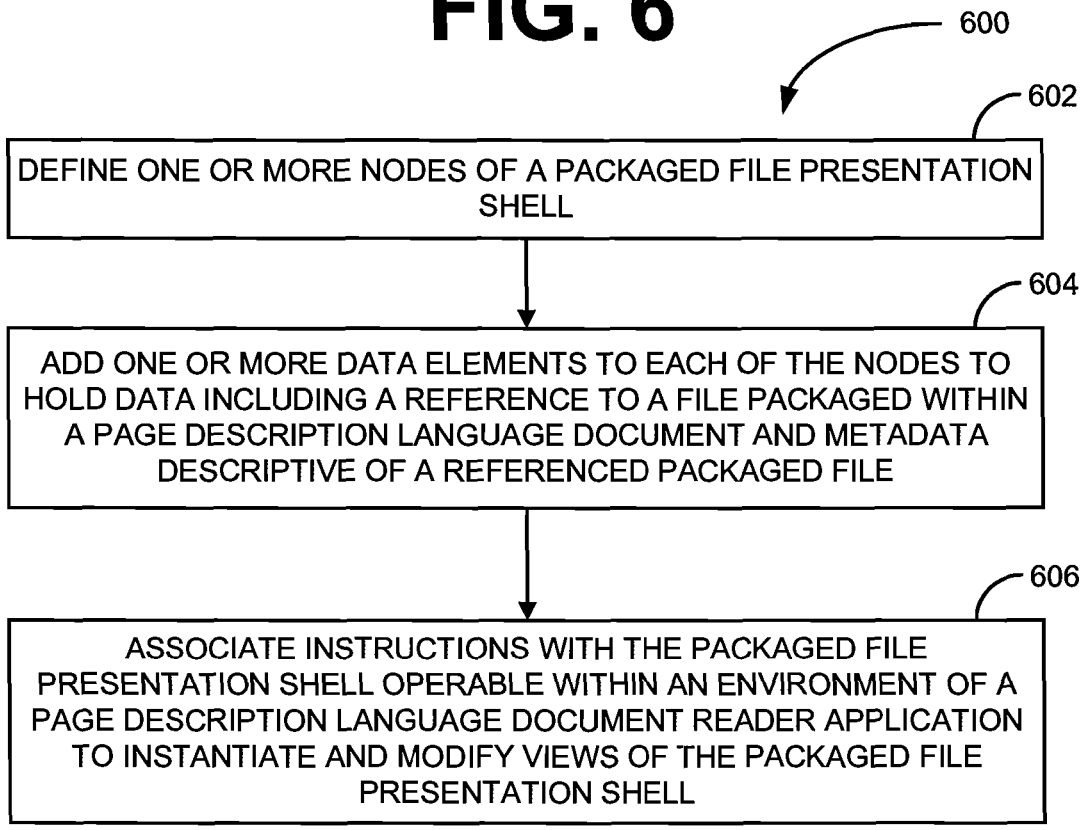

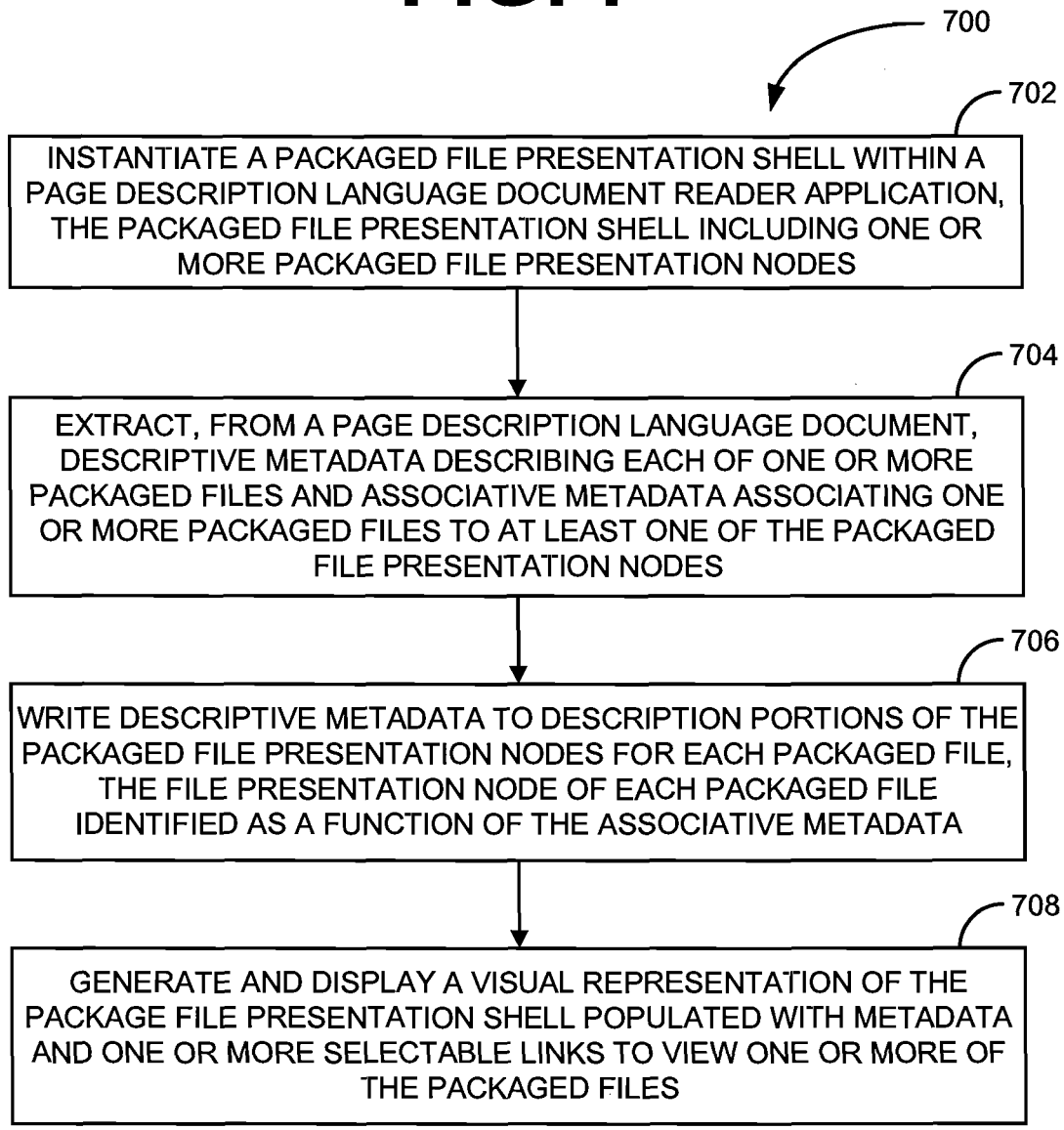

PRESENTATION OF FILES PACKAGED WITHIN A PAGE DESCRIPTION LANGUAGE DOCUMENT

BACKGROUND INFORMATION

Page description language documents, such as Portable Document Format documents are heavily used for many purposes. The number of purposes continues to grow as page description language specifications are expanded to provide more and more options for document creation and presentation. One of these options is the ability to package files within a page description language document.

BRIEF DESCRIPTION OF THE DRAWINGS

FIG. 3 is an illustration of a hierarchical node packaged file presentation shell according to an example embodiment.

FIG. 4 is a pseudo code listing of a page description language document according to an example embodiment.

FIG. 6 is a block flow diagram of a method according to an example embodiment.

FIG. 7 is a block flow diagram of a method according to an example embodiment.

DETAILED DESCRIPTION

Figure 1:
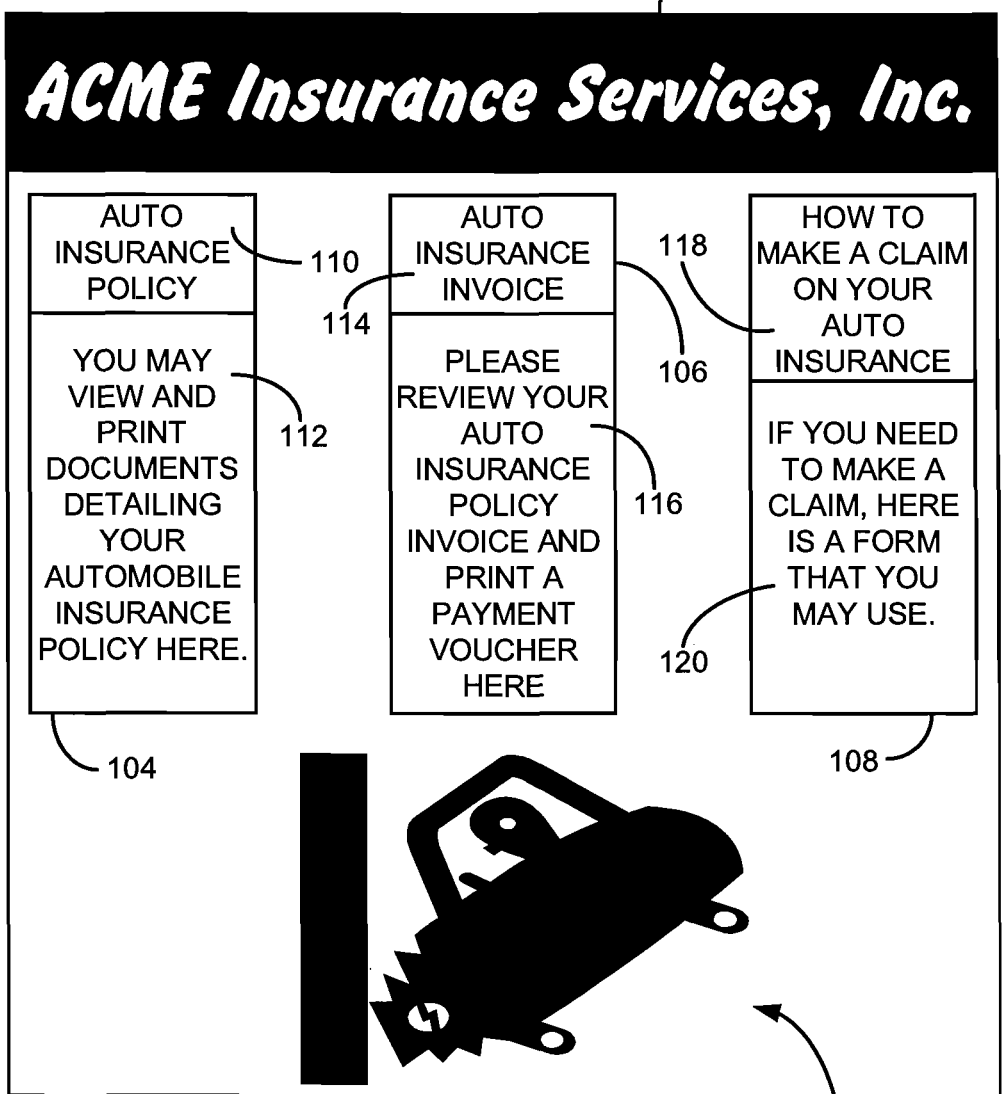
FIG. 1 is a user interface illustration according to an example embodiment.

Packaged files have typically been presented in page description language documents in simple listings or as links within page description language documents, such as Portable Document Format ("PDF") documents. Although such presentation methods provide access to the packaged files, contributions of the subject matter herein provide interactive ways to present access to the packaged files. Some embodiments provides mechanisms by which rich descriptions of packaged files may be presented which allows a viewer to quickly identify if the packaged file is relevant for a particular need without even opening the packaged file. Some embodiments may allow a viewer to select a mode of presentation of the packaged file. Some embodiments allow page description language document authors to include graphics, audio, moving images and videos, and views of packaged files within a packaged file presentation shell. As an ancillary benefit, packaged file presentation shells may be utilized to include branding information, such as company logos, information, product illustrations, and the like in an interactive presentation.

In some embodiments, a package of files may be presented in a user interface using a custom navigation template, which is referred to herein as a packaged file presentation shell. A packaged file presentation shell may include unique package branding (e.g., a package of files delivered by a company may be branded using that company's branding). Some such embodiments are supported by the creation and visualization of metadata regarding the package of files. For example, the metadata may be automatically determined, such as file type, creation date, length etc., or it may also be user inputted, such as commentary and notes regarding the package as a whole, or individual files included therein.

Multiple packaged file presentation shells may also be defined for a common file package. In addition, packaged file presentation shells may be made available for file package views. For example, a particular company may publish a number of packaged file presentation shells for various file packages that are typically assembled by that organization, each of these packaged file presentation shells including a custom navigation template and organization-specific branding.

In on example embodiment, a user interface packaged file presentation shell may be presented as columns, each column being dedicated to a particular file in the package, including metadata regarding a respective file or the package. In another embodiment, relationships between files and the package may be indicated. For example, a "mind map" may be created which indicates certain relationships that exist between files in a package. These and other embodiments are described in detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a user interface 100 illustration according to an example embodiment. The user interface 100 illustrates a page description language document including three packaged files created for a recipient presented using a packaged file presentation shell. The packaged file presentation shell, when instantiated in the user interface 100 includes a header 102, a body including three columns 104, 106, 108, and a footer including an image 122. The page description language document, in some embodiments, is a Portable Document Format ("PDF") document.

The header 102, in this embodiment, includes a graphic of a company of origin of the page description language document. The graphic is instantiated from an image file that may also be packaged within the page description language document. However, in some embodiments, the image file may be referenced by an Internet address in metadata of the packaged file presentation shell. Thus, in the event the company of origin modifies its image file, an updated image file may be stored to the Internet address and subsequent views of the page description language file using the packaged file presentation shell will display the modified image file.

The columns 104, 106, 108 of the body portion of the user interface 100 include a column for each of three documents. The columns, in this embodiment, each include a title 110, 114, 118 and a description 112, 116, 120. The titles and descriptions provide information to a viewer about a packaged file that may be viewed by selecting a respective column 104, 106, 108. For example, a user may desire to view information regarding the user's auto insurance policy. The user in such an example would select the left most column 104, such as by a clicking a mouse on the column. Such a selection, in some embodiments, may cause the underlying file to be displayed, such as in the user interface 200 of FIG. 2.

Figure 2:
FIG. 2 is a user interface illustration according to an example embodiment.

FIG. 2 is a user interface 200 illustration according to an example embodiment. The user interface 200 presents the auto insurance policy information file that is referenced by metadata underlying the left most column 104 of the user interface 100 in FIG. 1. The user interface 200 includes a header 202 and a body 204. The header 202 in this embodiment includes the same image file of the header 102 in the user interface 100 of FIG. 1. However, this image file need not be the same. This user interface 200 may be defined in manner completely independent of other user interfaces. However, each of the files underlying the columns 104, 106, 108 of the user interface 100 of FIG. 1 may be displayed in the user interface 200. The body 204 is an area within which a selected file may be displayed. The pane in various embodiments may be utilized to present documents, video, images, text, and other file and media types.

The user interfaces 100 and 200 of FIG. 1 and FIG. 2 are merely examples of packaged file presentation shells that may be created by developers and users. The only real limits on what such user interfaces may look like and how they may behave are relative to the scope of the packaged file presentation shell developer's imagination.

For example, FIG. 3 is an illustration of a hierarchical node packaged file presentation shell 300 according to an example embodiment. Such a hierarchical node packaged file presentation shell 300 may include multiple nodes which may be expanded and contracted by a viewer within in a hierarchical fashion when instantiated within a page description language reader application. Such a hierarchical node packaged file presentation shell 300 is therefore viewer interactive.

The example hierarchical node packaged file presentation shell 300 includes a top-level node 302 and multiple lower level nodes 304. In some embodiments, although the nodes may be at different levels in the hierarchy, each node may include identical data elements. For example, the data elements of each node, as in the illustrated data structure 306, may include:
  a node name;
  a reference to a parent node;
  an reference to a package file;
  referenced package file properties, such as file name, size, type, a created date, and a modified date;
  one or more icons or other images that may be used to represent the reference packaged file within the packaged file presentation shell when instantiated;
  a description of the referenced packaged file; and
  a location within the packaged file presentation shell to display the reference packaged file.

In other embodiments, there may be fewer or greater numbers of data elements and the data elements may be different depending on what is specified by a packaged file presentation shell developer. Some or all of these data elements may be displayed within a respective node, a column, a packaged file presentation shell hot spot, or other location specified within a packaged file presentation shell.

FIG. 4 is a pseudo code listing 400 of a page description language document according to an example embodiment. The page description language document, in this embodiment, includes five packaged files. The five packaged files include a packaged file presentation shell in 2.0 OBJ, packaged files 1, 2, and 3, and an image file in 6.0 OBJ that is referenced in the packaged file presentation shell. The pseudo code listing 400 includes a call to a packaged file presentation shell. In some embodiments, when a page description language document includes a packaged file presentation shell, the packaged file presentation shell is instantiated upon opening the page description language document.

A data structure of a packaged file presentation shell that may be included as a packaged file may include metadata associating each of one or more packaged files within a page description language document to a presentation node of the packaged file presentation shell. A presentation node may or may not be a hierarchical presentation node. The data structure of the packaged file presentation shell may further include data defining a packaged file presentation header to be presented with a packaged file when selected within a page description language reader application for display, such as is illustrated in FIG. 2. In some embodiments, the packaged file presentation shell also includes instructions executable within an environment of the page description language reader application to cause the packaged file presentation shell to be instantiated and displayed within a graphical user interface of the page description language reader application. In some embodiments, the instructions may also be executable to modify an appearance of the displayed packaged file presentation shell in response to one or more events, such as a user clicking a mouse on a node.

Figure 5:
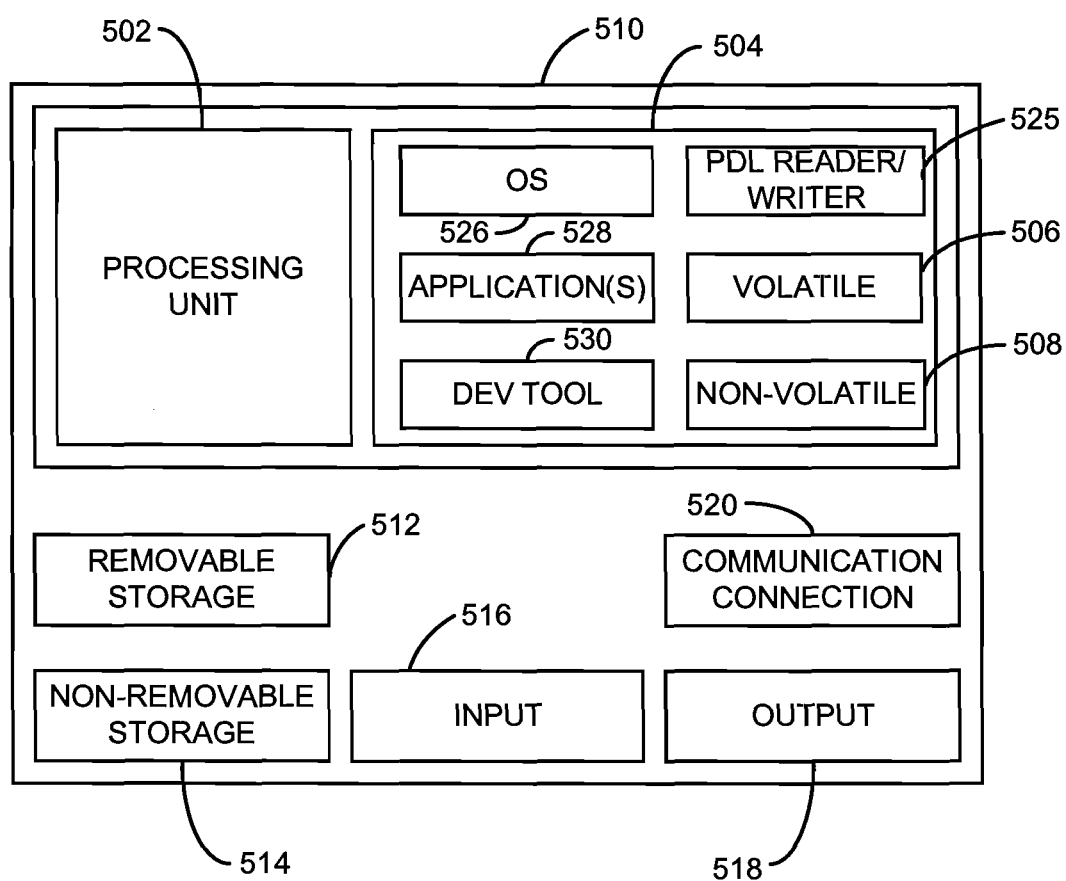
FIG. 5 is a block diagram of a computing device according to an example embodiment.

FIG. 5 is a block diagram of a computing device according to an example embodiment. One example computing device in the form of a computer 510 may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using the communication connection 520 to connect to one or more remote computers, such as database servers. The remote computer may include a personal computer (PC), server, router, network PC, a peer device or other common network node, or the like. The communication connection may include a Local Area Network ("LAN"), a Wide Area Network ("WAN"), the Internet, or other networks.

Computer-readable instructions stored on a computer-readable medium are executable by the processing unit 502 of the computer 510. A hard drive, CD-ROM, and RAM are some examples of articles including a computer-readable medium. The computer readable instructions typically include an operating system 526 and a page description language document reader application 525, which may also include the ability to write page description language documents. The computer readable instructions may also include one or more applications, which may be used to create and open files packaged within page description language documents, and a development tool 530, which may be used to create packaged file presentation shells.

An example of the page description language document reader application 525 is the ADOBE® ACROBAT® program available from ADOBE SYSTEMS INCORPORATED of San Jose, Calif. An example of the development tool 530 is the ADOBE® FLEX™ program that is also available from ADOBE SYSTEMS INCORPORATED. The FLEX™ program is a cross-platform development tool and framework for creating rich applications. Flex may be used to create packaged file presentation shells.

In typical embodiments, the computer 510 includes a page description language document including one or more packaged files. The page description language document may be stored in storage 512, 514 held in memory 504, downloaded over the communication connection 520, created using the page description language writer application 525, or created, stored, or received via another means. The page description language document, in some embodiments may include a packaged file presentation shell including a presentation node for each of the one or more packaged files. In some such embodiments, the page description language reader application 525 is operable to present a view of at least a portion the page description language document as a function of the metadata and the packaged file presentation shell. The packaged file presentation shell, when instantiated within a user interface of the page description language reader application 525, may be responsive to actions of a user. The actions of a user may include gestures made within the user interface with a pointing device. The packaged file presentation shell, in response to a user action, may cause one or more packaged file representations to be displayed. Such a packaged file representation typically includes at least a portion of the metadata associated describing a packaged file.

In some embodiments, the page description language reader application 225 includes one or more default packaged file presentation shells capable of displaying at least a portion of metadata of any page description language document including one or more packaged files. For example, a default packaged file presentation shell, when selected by a user, such as through a menu option, may display data selected from metadata including file name, file size, and a last saved date of each file packaged within a page description language document.

In some embodiments, the package file presentation shell, when instantiated within the page description language document reader application 525 may invoke one or more methods of a system plug-in operable within the page description language document reader application. In some embodiments, the plug-in may be the FLASH® Player plug-in also available from ADOBE SYSTEMS INCORPORATED.

FIG. 6 is a block flow diagram of a method 600 according to an example embodiment. The method 600 is an example method of defining a packaged file presentation shell. In typical embodiments, the method 600 includes defining one or more nodes of a packaged file presentation shell 602 and adding one or more data elements to each of the nodes to hold data including a reference to a file packaged within a page description language document and metadata descriptive of a referenced packaged file 604. A node in such embodiments is a container for a packaged document and the one or more data elements are containers for holding data descriptive of a file to be held in a respective node. The method 600 may further include associating instructions with the packaged file presentation shell. Such instructions are typically operable within an environment of a page description language document reader application to instantiate and modify views of the packaged file presentation shell 606.

In some embodiments, nodes may be generically defined within a packed file presentation shell and when used within a page description language document writer or authoring application, the nodes may be instantiated and linked to one another. Nodes may also be linked to locations within a packaged file presentation shell interface. Such locations may be defined as hot spots which when activated, cause a node to be displayed, or a view of a node to be modified. For example, if a packaged file presentation shell includes a background image of a car, a wheel may be defined as a hotspot. When the wheel receives focus or is moused over, a node of the wheel may be displayed or its view modified, such as by displaying more descriptive metadata.

Some embodiments of the method 600 may further include adding one or more image files to the packaged file presentation module and specifying a location within a user interface of the page description reader application of where to present each of the one or more image files. The specified location may be a header within a file presentation window opened upon an occurrence of a packaged file open event within the page description language document reader application.

FIG. 7 is a block flow diagram of a method 700 according to an example embodiment. The method 700 is an example of a method performed by a page description language reader application to cause a packaged file presentation shell to be displayed. One embodiment of the method 700 includes instantiating a packaged file presentation shell within a page description language document reader application, the packaged file presentation shell including one or more packaged file presentation nodes 702. The method 700 may further include extracting, from the page description language document, descriptive metadata describing each of one or more packaged files and associative metadata associating one or more packaged files to at least one of the packaged file presentation nodes 704. After the metadata is extracted, the method 700 may include writing descriptive metadata to description portions of the packaged file presentation nodes for each packaged file, the file presentation node of each packaged file identified as a function of the associative metadata 706. Some embodiments also include generating and displaying a visual representation of the package file presentation shell populated with metadata and one or more selectable links to view one or more of the packaged files 708.

In some embodiments, a file presentation node is a data structure within a packaged file presentation shell capable of holding data needed to instantiate a visual representation of the file presentation node. Such data may include one or more of linking metadata identifying a parent file presentation node, associative metadata associating the file presentation node to one or more packaged file within the page description language document, and descriptive metadata describing each of the one or more packaged files associated to the file presentation node. The linking metadata of a file presentation node, when not present, may be an indication that the file presentation node is at a highest level of a node hierarchy.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A system comprising:
    at least one processing unit and at least one memory device;
    a page description language document in the at least one memory device, the page description language document including:
        one or more packaged files;
        a packaged file presentation shell including a presentation node for each of the one or more packaged files; and
        metadata describing each of the one or more packaged files and associating each of the one or more packaged files to a presentation node of the presentation shell; and
    a page description language reader application in the at least one memory device and operable on the at least one processing unit to present a view of at least a portion of the page description language document as a function of the metadata and the packaged file presentation shell, wherein the package file presentation shell, when instantiated within a page description language document reader application, invokes one or more methods of a system plug-in operable within the page description language document reader application to present at least one of audio, moving images, and videos included in at least one of the packaged files.

2. The system of claim 1, wherein the packaged file presentation shell is responsive to actions of a user when instantiated within a user interface of the page description language reader application.

3. The system of claim 2, wherein the actions of a user include gestures made within the user interface with a pointing device.

4. The system of claim 2, wherein the packaged file presentation shell, in response to a user action, causes one or more packaged file representations to be displayed.

5. The system of claim 4, wherein a packaged file representation includes at least a portion of the metadata associated describing a packaged file.

6. The system of claim 1, wherein the packaged file presentation shell further includes a packaged file presentation header to be presented with a packaged file when selected within the page description language reader application to be displayed.

7. The system of claim 1, wherein the page description language reader application includes one or more default packaged file presentation modules capable of displaying at least a portion of metadata of any page description language document including one or more packaged files.

8. A method comprising:
    instantiating a packaged file presentation shell within a page description language document reader application, the packaged file presentation shell including one or more packaged file presentation nodes, the packaged file presentation shell, when instantiated, invoking at least one application plug-in thereby providing an interactive presentation of packaged files including at least one of audio, moving images, and videos included in at least one of the packaged files;
    extracting, from a page description language document, descriptive metadata describing each of one or more packaged files and associative metadata associating one or more packaged files to at least one of the packaged file presentation nodes;
    writing descriptive metadata to description portions of the packaged file presentation nodes for each packaged file, the file presentation node of each packaged file identified as a function of the associative metadata; and
    generating and displaying a visual representation of the package file presentation shell populated with metadata and one or more selectable links to view one or more of the packaged files.

9. The method of claim 8, further comprising:
    extracting the packaged file presentation shell from the page description language document.

10. The method of claim 8, wherein the metadata describing at least one of the packaged files of the page description language document includes an image to be presented within a packaged file presentation node when displayed.

11. The method of claim 8, wherein the page description language document is a Portable Document Format ("PDF") document.

12. The method of claim 8, wherein a file presentation node is a data structure within a packaged file presentation shell capable of holding data needed to instantiate a visual representation of the file presentation node, the data including one or more of:
    linking metadata identifying a parent file presentation node;
    associative metadata associating the file presentation node to one or more packaged file within the page description language document;
    descriptive metadata describing each of the one or more packaged files associated to the file presentation node.

13. The method of claim 12, wherein the linking metadata of a file presentation node, when not present, indicates that the file presentation node is at a highest level of a node hierarchy.

* * * * *